Jan. 15, 1957     C. R. VEGREN     2,777,718
QUICK ACTING CONNECTOR
Filed April 1, 1953
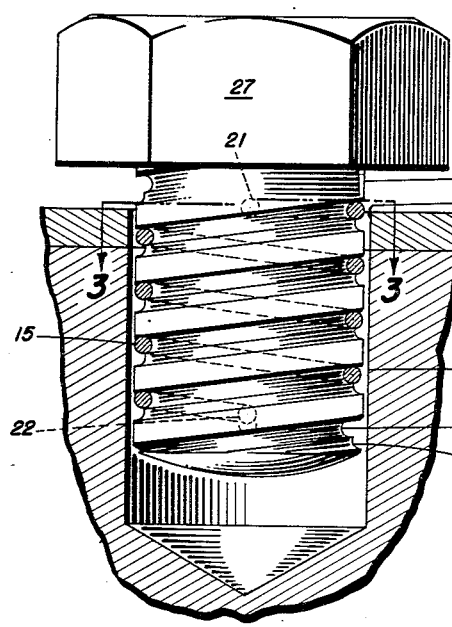
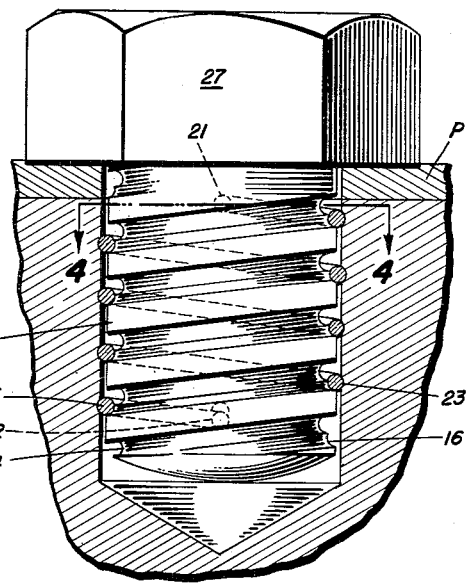
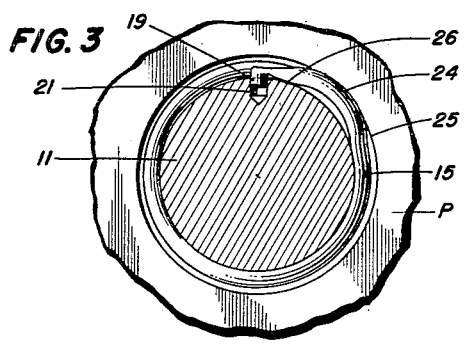
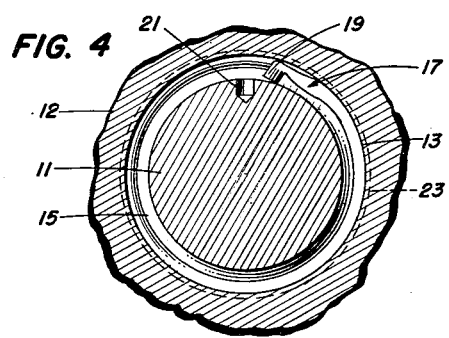
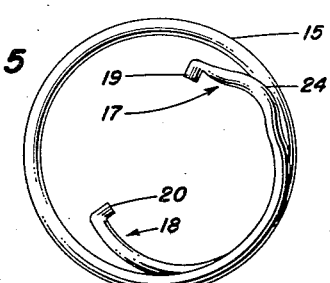
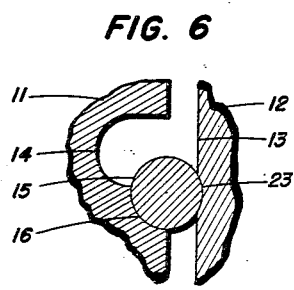
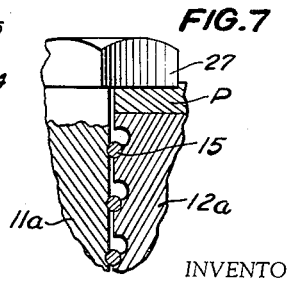
INVENTOR
CONRAD R. VEGREN
BY
ATTORNEYS United States Patent Office 2,777,718
Patented Jan. 15, 1957

2,777,718

QUICK ACTING CONNECTOR

Conrad R. Vegren, Washington, D. C.

Application April 1, 1953, Serial No. 346,290

8 Claims. (Cl. 287—119)

(Granted under Title 35, U. S. Code (1952), sec. 266)

The invention described herein may be manufactured and used by or for the Government of the United States of America for governmental purposes without the payment of any royalties thereon or therefor.

The present invention relates to a connector assembly and more particularly to a high strength, quick acting means for connecting mating parts which are to be joined and is a continuation in part of copending application, Serial No. 267,900, filed January 23, 1952, now matured to Patent No. 2,665,931 issued January 12, 1954.

When mating parts are to be connected, it is frequently necessary that the parts be quickly attachable and that the connection be positive and safe so that the mating members will not easily part during normal use. Means which have heretofore been used to connect such members have involved, among other things, the use of matching internal and external threads, detents, keys, and pins. Where large numbers of parts must be quickly assembled, threaded connections are often unsuitable because of the time and labor required to secure the members together. The other methods of attachment enumerated above involve either a considerable waste of time in assembly or do not provide a sufficiently positive connection between members.

The present invention overcomes the disadvantages associated with the prior art connecting means by providing a tensioned coil spring which, prior to joining of the parts, lies radially depressed in a first relatively deep helical groove on a male member, the depth of the groove being substantially equal to the cross-sectional diameter of the spring wire. In addition to the first helical groove there is provided on the male member, adjacent to said first groove, a second relatively shallow helical groove having a depth less than the cross-sectional diameter of the spring wire. A female member is provided with a smooth walled aperture having a diameter slightly greater than the diameter of the outer surface of the male member. The arrangement is such that when the members are joined the coil spring expands against the wall of the aperture whereupon a tight coupling between the members is effected by relative rotation of the members to cause the turns of the coil spring to move from the relatively deep helical groove on the male member into the relatively shallow helical groove, the turns of the coil thereby being impressed into the wall of the aperture to provide, in effect, a thread coupled joint.

With the foregoing in mind, it is an object of the present invention to provide an interlocking connection for two members.

Another object of the invention is to provide a connector of the above type which is both positive in operation and quick acting.

Another object of the invention is to provide a joint wherein the mating members may be connected by only slight relative rotation.

Still another object is to provide an effective thread coupling wherein one mating member is initially unthreaded.

Another object of the invention is the provision of a connection for mating members which employs a spring wire connector to engage in aligned grooves in said members and wherein the groove in one of said members is formed when the parts are joined.

Other objects and many of the attendant advantages of this invention will be readily appreciated as the same becomes better understood by reference to the following detailed description when considered in connection with the accompanying drawings wherein:

Fig. 1 is a side elevation, partly in vertical section, of one embodiment of the present invention, the parts being shown in preassembled position;

Fig. 2 is a view similar to Fig. 1 but showing the parts in their assembled position;

Fig. 3 is a horizontal cross-sectional view taken along a line substantially corresponding to line 3—3 of Fig. 1 and showing one end of the coil spring connector in its unexpanded position on the male member as it appears before connection with the female member;

Fig. 4 is a horizontal cross-sectional view taken along a line substantially corresponding to line 4—4 of Fig. 2 showing the same end of the coil spring connector in its expanded position as it appears after the connection of the mating members;

Fig. 5 is an end view of the coil spring that is employed in the present invention showing the inturned ends of the spring wire; and Fig. 6 is an enlarged fragmentary sectional view of the parts in their assembled position and showing the deep and shallow helical grooves on the male member with a turn of the coil spring connector positioned in the shallow helical groove and embedded in the wall of the aperture in the female member;

Fig. 7 is a fragmentary side view of another mbodiment of the present invention, the parts being shown in assembled position.

Referring now to the drawings wherein like reference numerals designate like parts throughout the several views and more particularly to Fig. 1 wherein there is illustrated one form of the present coupling assembly which includes an externally grooved male connecting member 11 which is to be connected to a female member 12 provided with a smooth walled aperture 13. The invention is shown as being applied to a cap screw for securing a plate P to the apertured female member but it is apparent that the present coupling may be utilized for numerous other purposes as for example, a connection between two shafts, etc. Male member 11 has a relatively deep external helical groove 14 machined therein which extends along the length thereof for accommodating the coil connector spring 15 shown in Fig. 5. In addition there is provided a relatively shallow helical groove or shelf 16 which lies adjacent to and is coextensive with the deep helical groove for accommodating the connector spring 15 in the assembled position of the mating members (Fig. 2). The groove 14 is of a depth which is preferably equal to or slightly greater than the diameter of the material from which the spring is constructed and has a cross-sectional configuration complementary to that of the spring material, so that when the spring is mounted in the helical groove 14 the outer surface of the spring lies substantially flush with or slightly below the outer surface of member 11, the member thus presenting a substantially smooth surface relatively free from any obstruction that might impede the insertion of member 11 into member 12. The spring 15, which in a normal expanded condition (Fig. 5) has a larger external diameter than the diameter of the aperture 13, has ends 17 and 18 which are of smaller arc radius than the intermediate convolutions of the spring and the arc radius of the male member. These ends 17 and 18 terminate in inwardly projecting spring retaining tangs 19 and 20, respectively, which serve as locking means to maintain the turns of the coil spring 15 within the confines of helical groove 14 in the male member by engaging suitable recesses 21 and 22 located at opposite ends of the groove 14. The recess 22 is elongated, as shown in Fig. 1, and extends across the deep and shallow helical grooves 14 and 16 to permit the movement of the turns of coil spring 15 from groove 14 to groove 16. The tangs 19 and 20 are maintained in their respective recesses 21 and 22 by the inwardly directed radial forces exerted by the end convolutions 17 and 18, which are in a distorted condition with a reduced arc radius equal to that of the deep groove 14. The distance between recesses 21 and 22, measured along the longitudinal axis of the male connecting member 11, is greater than the distance between the tangs 19 and 20 of coil spring 15 as measured along the longitudinal axis of the spring in its normal expanded condition whereby to position tangs 19 and 20 in the respective recesses 21 and 22 it is necessary to apply a tension to the spring along its longitudinal axis which places the spring under radial compression. This keeps the coil spring snugly seated in the deep groove 14 of the male member until released.

Female connecting member 12 has a cylindrical aperture 13 therein of a diameter which is slightly greater than the diameter of the male member 11, the wall of the aperture being smooth prior to the assembly of the mating parts. Upon axial insertion of member 11 into member 12 the connector spring 15 expands into contact with the wall of the cavity 13 whereupon relative rotation of members 11 and 12 forces the coils of the spring from the deep groove 14 into the shallow groove 16, the outer surface of the coils thereby being impressed into the wall of the aperture to deform the wall and provide a shallow helical groove 23 therein. The male and female members are thus locked together against axial separation by the spring 15 contacting the respective members and lying in grooves 16 and 23 (Fig. 2). An effective thread coupled connection is thereby provided which may, if later desired, be readily separated by rotation of either of the members in a manner common to any threaded connection.

The loaded spring 15 is released to expand radially by withdrawal of tang 19 from its recess 21 (Fig. 4). The tang 19 is withdrawn by pressure being exerted upon a deformed hump 24 which extends beyond the outer surface of member 11 when the spring 15 is loaded thereon (Fig. 3). In the embodiment shown, pressure is applied to the hump portion 24 by leading edge 25 of the female member 12 when the members 11 and 12 are joined. The leading edge engages the rounded surface of the hump portion and cams it into groove 14 of member 11 (Fig. 4), whereupon tang 19 is raised from recess 21 due to a lever action acting about fulcrum point 26 thus conditioning the spring to expand radially into the contact with the wall of aperture 13. The members 11 and 12 are then urged together until leading edge 25 contacts the undersurface of head 27 on the male member whereupon the members are twisted relatively to each other in such a manner that, in the embodiment shown, member 11 turns in a clockwise direction, when viewed from above in Fig. 2, with respect to member 12. Upon such relative twisting of members 11 and 12 the turns of the coil are moved from groove 14 on the male member into groove 16 owing to the combined action of two forces which result in an axial movement of the convolutions of the coil toward the bottom of member 11. The first of these forces arises because of the inherent tendency of a coil to assume its normally axially compressed condition upon the release of tang 19 and radially outward expansion of the coil. Since the lower end of the coil is fixed against axial movement on the male member by engagement of tang 20 in recess 22 there will be forces exerted at each point along the length of the coil tending to move each convolution toward recess 22 and hence acting to seat the coil turns in the shallow helical groove 16. The second of these forces results from the radial expansion of the coil spring against the wall of aperture 13. Since in its normal expanded condition the diameter of the spring connector is greater than the diameter of the aperture, the convolutions of the coil will exert a pressure aaginst the surface of the aperture so that when member 11 is twisted in a clockwise direction relative to member 12 the friction between the outer coil surfaces and the wall of the aperture directs a force along the length of the spring wire. At each point along the length of the spring wire this force may be resolved into two vector components, one of which acts at right angles to the axis of the aperture and tends to increase pressure of the coil against the surface of the aperture, and hence increase the frictional drag force, and the other of which components acts downwardly and parallel to the axis of the aperture and tends to seat the coil in groove 16. It is thus apparent that these two axial forces which are exerted on the turns of the spring connector when members 11 and 12 are twisted relatively to each other will cause the turns of the coil to ride into and be seated in the shallow groove 16 (Figs. 2 and 6), and, since the depth of groove 16 is less than the diameter of the spring wire 15, the outer surface of the coil convolutions will be impressed into the surface of aperture 13 thereby deforming the surface to provide a helical groove 23 in the member 12 (Fig. 6). The mating members 11 and 12 are thus locked together against axial separation by the spring contacting the respective members and lying in grooves 16 and 23. It is clear, however, that separation of the parts may be accomplished by twisting member 11 in a counterclockwise direction after groove 23 has been formed in member 12 so as to unscrew member 11 from member 12 as in the conventional screw threaded fastening. It is further apparent that after the members 11 and 12 have been initially joined and separated the male member may be subsequently united to member 12 by inserting member 11 into cavity 13 and twisting the members relative to each other until the groove 16 and groove 23, formed by the initial joining of the members, are in registry throughout their length whereupon the spring 15 will expand into groove 23 and hold the members securely together.

In view of the above disclosure, another embodiment becomes readily apparent to those skilled in the art. In this variation, as shown in Fig. 7, the deep and shallow grooves are initially formed in the female member instead of in the male member as shown in Figs. 1, 2, and 6. The spring is then reversed so that the tangs are directed outwardly and the deformed portion extends inwardly. The spring 15 is held in radial tension within the helical grooves of the female member 12a to be radially compressed upon contact of the members and thereby engage the male member 11a to lock the parts together.

Referring again to the first embodiment and assuming the male and female members are of a type which are stored separately to be assembled just prior to use, the male member is provided, at the time of manufacture, with the hereinbefore described grooves and the spring 15 is assembled within the groove 14 by expanding the end convolutions 17 and 18 sufficiently to permit the spring to slide over the exterior surface of the male member until the tang 19 registers with its recess 21 whereupon releasing the convolution 17 permits the tang 19 to engage the recess 21 by the convolution's natural resiliency. The spring 15 may be then worked into and along the groove 14 until the tang 20 registers with its recess 22, the tang naturally seating therein because of the reduced diameter of the last convolution 18. Thus, the spring 15 will be retained in a tensioned condition in the groove 14, and the male and female members may be quickly assembled at some future time by the simple process of sliding them together until the hump portion 24 of the spring 15 is depressed by the leading edge 25 of the female member to disengage the tang 19 from recess 21 and permits the spring 15 to expand radially. The members 11 and 12 are thereafter locked by rotating them relatively to each other to cause spring 15 to ride up and be seated in groove 16 of the male member.

Obviously many modifications and variations of the present invention are possible in the light of the above teachings. It is therefore to be understood that within the scope of the appended claims the invention may be practiced otherwise than as specifically described.

What is claimed is:

1. In a connector assembly, a male member and a female member, one of said members having a first helical groove contiguous with a second helical groove of a depth materially less than that of said first groove such that the first and second grooves form a single stepped groove, radially and axially tensioned resilient means seated in said first groove, said first groove being of a depth to contain said means with the outer surface thereof substantially flush with the mating surface of said one member, means to release said resilient means for movement into contact with the mating surface of the other of said members upon axial assembly of the members, the contiguous relationship of said first groove and said second groove of the single stepped groove permitting the resilient means to be caused to move from said first groove into said second groove upon relative rotation of the members, said resilient means thereby being frictionally urged between the mating surface of the other of said members and said second groove to effectively lock said members against axial separation.

2. In a connector assembly, a male member and a female member, one of said members having a first helical groove and a second helical groove communicating with and adjacent to and of a depth materially less than the depth of said first groove such that said first and second grooves form a single stepped groove, the mating surface of the other of said members being smooth and uninterrupted, an axially and radically tensioned spring seated in said first groove and having tangs formed on the opposite ends thereof, said first groove receiving said spring being of a depth substantially equal to the thickness of the spring material and having tang receiving recesses therein to retain the spring in its axially and radially tensioned condition in said first groove, said second groove being of a depth substantally less than the thickness of the spring material and being of a character such that the spring may pass from the first groove to the second groove and whereby when the spring is seated in said second groove a portion thereof protrudes beyond the mating surface of said one member, said spring having a deformed hump portion adjacent one end thereof for contact with said other member to disengage a tang from its recess whereby the spring is released to expand radially and axially into contact with said smooth mating surface upon axial assembly of the members, the expansion of the spring being sufficient to cause the spring to move from said first groove into said second groove upon relative rotation of the members, the expansion of said spring thereby forcing the spring between said smooth mating surface and said second groove to effectively lock said members together against axial separation.

3. A male connector member for joining to a female connector member having a smooth walled aperture comprising a mating portion with a first helical groove and a communicating second helical groove of a depth materially less than the depth of said first groove such that a single stepped groove is formed, a radially and axially tensioned resilient means seated in said first groove, said first groove being of a depth to contain said means with the outer surface thereof substantially flush with the surface of said mating portion and being so related with said second groove that the resilient means may pass from the first groove into the second groove upon expansion, releasable means for retaining said resilient means in a tensioned condition in said first groove, mating relationship between the members being such that upon axial joining and subsequent relative rotation of the members the resilient means is released and is caused to move into said second groove and thereby to be frictionally forced between the wall of the aperture in the female member and the second groove to effectively lock said members together against axial separation.

4. In a connector assembly, a male member having an external spiral stepped grove, a female member having a smooth walled aperture, a resilient radically and axially tensioned spring positioned in one of the steps of said stepped groove of the male member, said spring being adapted to pass from one step of the groove to another step of the groove, one step of said stepped groove being of a depth substantially equal to the thickness of the spring material, interengaging means on the spring and male member to maintain the spring in a tensioned condition in the groove, and means to release the interengaging means upon assembly of the members such that the spring is forced to expand from one step into the other step of the male member groove and into contact with the walls of said female member to lock said members together.

5. In a conection of male and female members, a male member having an external spiral stepped groove, a female member having an internal smooth wall, a resilient spring mounted in radial and axial tension in one step of the stepped groove of the male member, tangs on the opposite ends of the spring, the step which receives the spring being of a depth substantially equal to the thickness of the spring material and having tang receiving recesses therein to retain the spring mounted in the step of said groove in an axially and radially tensioned condition when the tangs are seated in their recesses in the step, the other step of said groove being of a depth materially less than the thickness of the spring material, and a deformed portion in said spring adjacent one end thereof for contact with the opposite member to disengage a tang from its recess such that the spring may be released to expand from the step in which the spring is mounted into the other step upon assembly of the members.

6. In a connector assembly, a male member having a smooth-walled mating surface, a female member having a walled aperture, the walls of the aperture being provided with a helical stepped groove, a resilient radially and axially tensioned spring positioned in one of the steps of said stepped groove of the female member, said spring being adapted to pass from one step of the groove to another step of the groove, one step of said stepped groove being of a depth substantially equal to the thickness of the spring material, interengaging means on the spring and female member to maintain the spring in a tensioned condition in the groove, and means to release the interengaging means upon assembly of the members such that the spring is forced to expand from one step into the other step of the female member groove and into contact with the walls of said male member to lock said members together.

7. In a connector assembly of male and female members, a male member having a smooth-walled mating surface, a female member having a walled aperture, the walls of the aperture being provided with a helical stepped groove, a resilient spring mounted in radial and axial tension in one step of the stepped groove of the female member, tangs on the opposite ends of the spring, the step which receives the spring being of a depth substantially equal to the thickness of the spring material and having tang receiving recesses therein to retain the spring mounted in the step of said groove in an axially and radially tensioned condition when the tangs are seated in the recesses in the step, the other step of said groove being of a depth materially less than the thickness of the spring material, and a deformed portion in said spring adjacent one end thereof for contact with the opposite member to disengage a tang from its recess such that the spring may be released to expand from the step in which the spring is mounted into the other step upon assembly of the members.

8. A female connector member for joining to a smooth-walled male member comprising a mating portion having a walled aperture, the walls of the aperture being provided with a first helical groove and a communicating second helical groove of a depth materially less than the depth of said first groove such that a single stepped groove is formed, a radially and axially tensioned resilient means seated in said first groove, said first groove being of a depth to contain said means with the outer surface thereof substantially flush with the surface of said mating portion and being so related with said second groove that the resilient means may pass from the first groove into the second groove upon expansion, releasable means for retaining said resilient means in a tensioned condition in said first groove, the mating relationship between the members being such that upon axial joining and subsequent relative rotation of the members the resilient means is released and is caused to move into said second groove and thereby to be frictionally forced between the wall of the male member and the second groove to effectively lock said members together against axial separation.

References Cited in the file of this patent

UNITED STATES PATENTS

| | | |
|---|---|---|
| 806,406 | Farrington | Dec. 5, 1905 |
| 806,407 | Farrington | Dec. 5, 1905 |
| 806,408 | Farrington | Dec. 5, 1905 |
| 906,691 | Chenoweth | Dec. 15, 1908 |
| 2,346,051 | Seamark | Apr. 4, 1944 |
| 2,665,931 | Vegren | Jan. 12, 1954 |

FOREIGN PATENTS

| | | |
|---|---|---|
| 681,811 | France | of 1930 |